(12) United States Patent
Kada et al.

(10) Patent No.: US 6,364,051 B1
(45) Date of Patent: Apr. 2, 2002

(54) ELECTRIC POWER STEERING SYSTEM

(75) Inventors: Tomoyasu Kada, Kaizuka; Shiro Nakano, Chihayaakasaka-mura; Katsutoshi Nishizaki, Nabari; Takanobu Takamatsu, Habikino; Masaya Segawa, Tenri; Ryouhei Hayama, Nabari, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/679,633

(22) Filed: Oct. 5, 2000

(30) Foreign Application Priority Data

Oct. 7, 1999 (JP) ............................................. 11-286930

(51) Int. Cl.[7] .............................. B60D 5/04; B60D 6/00; B60D 119/00

(52) U.S. Cl. ......................................... 180/446; 701/42

(58) Field of Search ................................ 180/443, 446; 701/41, 42

(56) References Cited

U.S. PATENT DOCUMENTS

| | | | |
|---|---|---|---|
| 5,361,210 A | * | 11/1994 | Fu |
| 6,129,172 A | * | 10/2000 | Yoshida et al. |
| 6,223,852 B1 | * | 5/2001 | Mukai et al. |
| 6,226,580 B1 | * | 5/2001 | Noro et al. |
| 6,260,655 B1 | * | 7/2001 | Mukai et al. |

* cited by examiner

Primary Examiner—Kevin Hurley
(74) Attorney, Agent, or Firm—Rabin & Berdo, P.C.

(57) ABSTRACT

An electric power steering system which assists a steering operation by controlling an electric motor on the basis of a target electric current determined in accordance with a steering torque applied to an operation member and applying a driving force to a steering mechanism from the electric motor. The system includes steering torque detecting section; target electric current determining circuit for determining a target electric current in accordance with the steering torque on the basis of an assist characteristic; and motor controlling circuit for controlling the electric motor on the basis of the target electric current. The assist characteristic is offset from an initial characteristic when a motor vehicle incorporating the system is in a predetermined turning state.

14 Claims, 5 Drawing Sheets

Ta : TARGET ELECTRIC CURRENT
To : NORMAL VALUE

Ta : TARGET ELECTRIC CURRENT
To : NORMAL VALUE

ELECTRIC POWER STEERING SYSTEM

BACKGROUND OF THE INVENTION

1. Field of the Invention

The present invention relates to an electric power steering system which assists a steering operation by applying a driving force to a steering mechanism from an electric motor controlled to be driven according to a steering torque.

2. Description of Related Art

Conventionally, motor vehicles incorporate an electric power steering system which assists a steering operation by transmitting a driving force to a steering mechanism from an electric motor. The electric motor is feedback-controlled on the basis of a target electric current determined in accordance with a steering torque applied to a steering wheel, whereby a steering assist force is applied to the steering mechanism in accordance with the steering torque.

When a motor vehicle travels a long and gently curved road of an entrance ramp, an exit ramp or a main lane on a highway, or turns to change its traveling direction, the motor vehicle assumes a turning state to turn in a circular orbit of a generally constant curvature. When the motor vehicle is in the turning state, a driver applies a generally constant torque to the steering wheel to keep the steering wheel at a generally constant steering angle, i.e., the driver performs a steering hold-on operation.

When the motor vehicle is in the turning state mentioned above, the driver should perform the steering hold-on operation for a relatively long period. Even with the steering assist, the steering hold-on operation is burdensome to the driver and, therefore, leaves room for improvement to provide a better steering feeling.

SUMMARY OF THE INVENTION

It is an object of the present invention to provide an electric power steering system which alleviates the burden to a driver for the improvement of the steering feeling when a motor vehicle is in the turning state.

An electric power steering system according to the present invention, which assists a steering operation by controlling an electric motor on the basis of a target electric current determined in accordance with a steering torque applied to an operation member and applying a driving force to a steering mechanism from the electric motor, comprises: a steering torque detecting section for detecting a steering torque; a target electric current determining circuit for determining a target electric current in accordance with the steering torque detected by the steering torque detecting section on the basis of an assist characteristic indicative of a relationship between the steering torque and the target electric current; a motor controlling circuit for controlling the electric motor on the basis of the target electric current determined by the target electric current determining circuit for driving the electric motor; and an assist characteristic modifying circuit for modifying the assist characteristic by offsetting the assist characteristic from an initial characteristic when a motor vehicle incorporating the electric power steering system is in a predetermined turning state.

In accordance with the present invention, the assist characteristic which determines the target electric current according to the steering torque is offset from the initial characteristic for the modification thereof when the motor vehicle is in the turning state. Thus, a steering assist force to be generated in the turning state has a magnitude different from that to be generated in a traveling state other than the turning state.

More specifically, if the assist characteristic is offset from the initial characteristic so as to cause the electric motor to generate a greater driving force in the turning state, a steering assist force greater than that to be applied in the other traveling state can be applied to the steering mechanism. Thus, a steering hold-on operation can properly be assisted, so that the burden to the driver can be alleviated for the improvement of the steering feeling.

In the electric power steering system, the assist characteristic modifying circuit may comprise a circuit for determining that the motor vehicle is in the predetermined turning state on condition that the steering torque detecting section keeps detecting a torque not smaller than a predetermined level for not less than a predetermined period.

The electric power steering system may further comprise a steering angle detecting section for detecting a steering angle of the operation member. In this case, the assist characteristic modifying circuit preferably comprises a circuit for determining that the motor vehicle is in the predetermined turning state on condition that the steering angle detecting section keeps detecting a steering angle not smaller than a predetermined level for not less than a predetermined period.

The electric power steering system may further comprise a vehicle speed detecting circuit for detecting a speed of the motor vehicle. In this case, the assist characteristic modifying circuit preferably offsets the assist characteristic from the initial characteristic on condition that the vehicle speed detected by the vehicle speed detecting section is not higher than a first vehicle speed.

With this arrangement, the assist characteristic is offset from the initial characteristic on condition that the vehicle speed is not higher than the first vehicle speed. This arrangement is preferably applied, for example, to a case where the motor vehicle turns to change its traveling direction. Where the first vehicle speed is set at about 30 km/hour, for example, the assist characteristic may be offset when the motor vehicle is in a turning state with a relatively great steering angle (a first steering angle which may be, for example, a rotation angle of a steering wheel of not smaller than about 180 degrees). Thus, a relatively great steering assist force can be applied to the steering mechanism in the turning state, so that the burden to the driver can be alleviated for the improvement of the steering feeling.

Where the electric power steering system further comprises the vehicle speed detecting section for detecting the speed of the motor vehicle, the assist characteristic modifying circuit may offset the assist characteristic from the initial characteristic on condition that the vehicle speed detected by the vehicle speed detecting section is not lower than a second vehicle speed.

The second vehicle speed is preferably higher than the first vehicle speed.

Where the assist characteristic is gradually changed from the initial characteristic to the offset characteristic, the rate of the change in the assist characteristic is preferably lower in a case where the vehicle speed is not lower than the second vehicle speed than in a case where the vehicle speed is not higher than the first vehicle speed.

With this arrangement, the assist characteristic is offset from the initial characteristic on condition that the vehicle speed is not lower than the second vehicle speed. This arrangement is preferably applied to a case where the motor vehicle travels a gently curved road on a highway. Where the second vehicle speed is set at about 80 km/hour, for example, the assist characteristic may be offset when the motor vehicle is in a turning state with a relatively small steering angle (a second steering angle which is, for example, a rotation angle of the steering wheel of not smaller than about 15 degrees). Thus, the steering assist force can be increased when the motor vehicle travels the gently curved road on the highway, so that the burden to the driver for the steering hold-on operation can be alleviated for the improvement of the steering feeling.

The assist characteristic modifying circuit preferably comprises an assist characteristic transition circuit for gradually effecting transition of the assist characteristic to an initial offset characteristic which is offset by a predetermined value from the initial characteristic when the motor vehicle comes into the predetermined turning state.

With this arrangement, the transition of the assist characteristic from the initial characteristic to the initial offset characteristic is gradually effected, so that an abrupt change in the steering assist force can be prevented for further improvement of the steering feeling.

The assist characteristic modifying circuit preferably further comprises a torque adapting circuit for further modifying the assist characteristic in accordance with the change in the steering torque detected by the steering torque detecting section after the transition of the assist characteristic to the initial offset characteristic.

With this arrangement, the assist characteristic is further modified in accordance with the change in the steering torque after the transition of the assist characteristic to the initial offset characteristic. Thus, the assist characteristic can be adapted for the steering state, thereby further improving the steering feeling.

Where the steering wheel is operated to increase the steering angle in the turning state, for example, the steering torque is increased, so that an assist torque is increased. Where the steering wheel is returned, on the contrary, the steering torque is reduced, so that the assist torque is reduced. Therefore, a difference between the steering torques applied to the steering wheel in the opposite directions for the correction of the steering operation is reduced, so that the burden for the steering operation is reduced.

The assist characteristic modifying circuit preferably further comprises an initial offset determining circuit for determining the initial offset characteristic in accordance with a magnitude of the steering assist force applied during a predetermined period before the assist characteristic is changed to the initial offset characteristic.

With this arrangement, the initial offset characteristic is determined on the basis of the magnitude of the steering assist force (the magnitude of the steering torque or the level of the target electric current) before the assist characteristic is changed. Therefore, the initial offset characteristic can be optimized for further improvement of the steering feeling.

The foregoing and other objects, features and effects of the present invention will become more apparent from the following description of the preferred embodiments with reference to the attached drawings.

DESCRIPTION OF THE PREFERRED EMBODIMENTS

Figure 1:
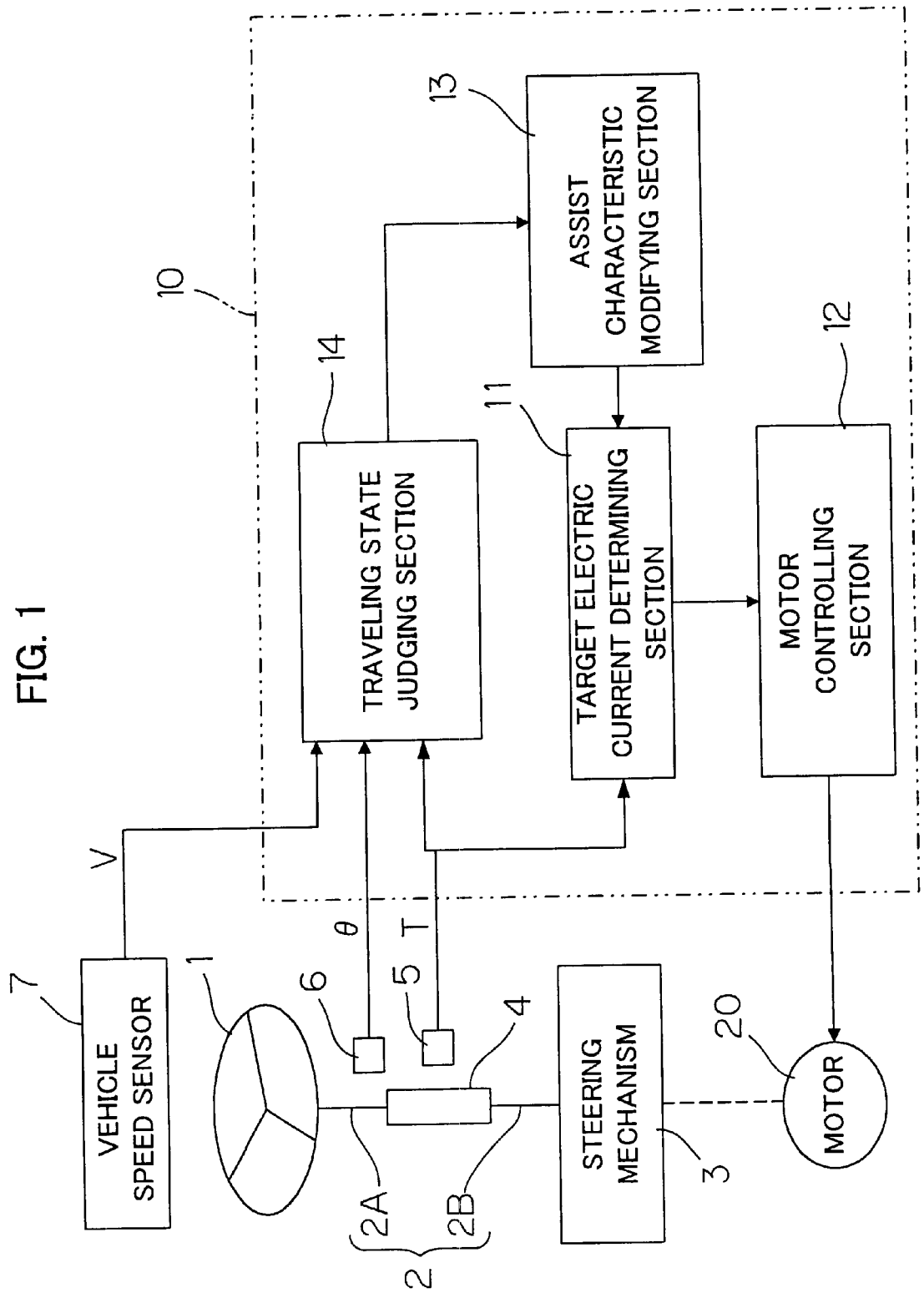
FIG. 1 is a block diagram illustrating the electrical construction of an electric power steering system according to a first embodiment of the present invention.

FIG. 1 is a block diagram illustrating the electrical construction of an electric power steering system according to a first embodiment of the present invention. A steering torque applied to a steering wheel (operation member) 1 is transmitted to a steering mechanism 3 via a steering shaft 2. A driving force generated by an electric motor 20 is transmitted as a steering assist force to the steering mechanism 3.

The steering shaft 2 is divided into an input shaft 2A coupled to the steering wheel 1 and an output shaft 2B coupled to the steering mechanism 3. The input shaft 2A and the output shaft 2B are coupled to each other via a torsion bar 4. The torsion bar 4 is twisted in accordance with the steering torque T, and the direction and amount of the torsion is detected by a torque sensor 5. An output signal of the torque sensor 5 is inputted to a controller (ECU) 10.

The controller 10 applies a driving electric current to the electric motor 20 in accordance with the steering torque T detected by the torque sensor 5 to control the driving of the electric motor 20 so that the steering assist force is applied to the steering mechanism 3 in accordance with the steering torque T. Besides the output signal of the torque sensor 5, an output signal of a steering angle sensor 6 for detecting a steering angle θ as the rotation angle of the steering wheel 1 and an output signal of a vehicle speed sensor 7 for detecting the speed V of a motor vehicle incorporating the inventive electric power steering system are inputted to the controller 10.

The controller 10 performs program-based processes by means of a microprocessor incorporated therein to effect the function of a target electric current determining section 11 for determining a target electric current according to the steering torque T, the function of a motor controlling section 12 for feedback-controlling the electric motor 20 on the basis of the target electric current determined by the target electric current determining section 11, the function of an assist characteristic modifying section 13 for modifying an assist characteristic indicative of a characteristic relationship between the steering torque and the target electric current in the target electric current determining section 11, and the function of a traveling state judging section 14 for judging whether the motor vehicle is in a predetermined turning state.

The traveling state judging section 14 judges whether the motor vehicle is in the predetermined turning state on the basis of at least one of the vehicle speed V detected by the vehicle speed sensor 7, the steering angle θ detected by the steering angle sensor 6 and the steering toque T detected by the torque sensor 5, and applies a signal indicative of the result of the judgment to the assist characteristic modifying section 13.

Figure 2:
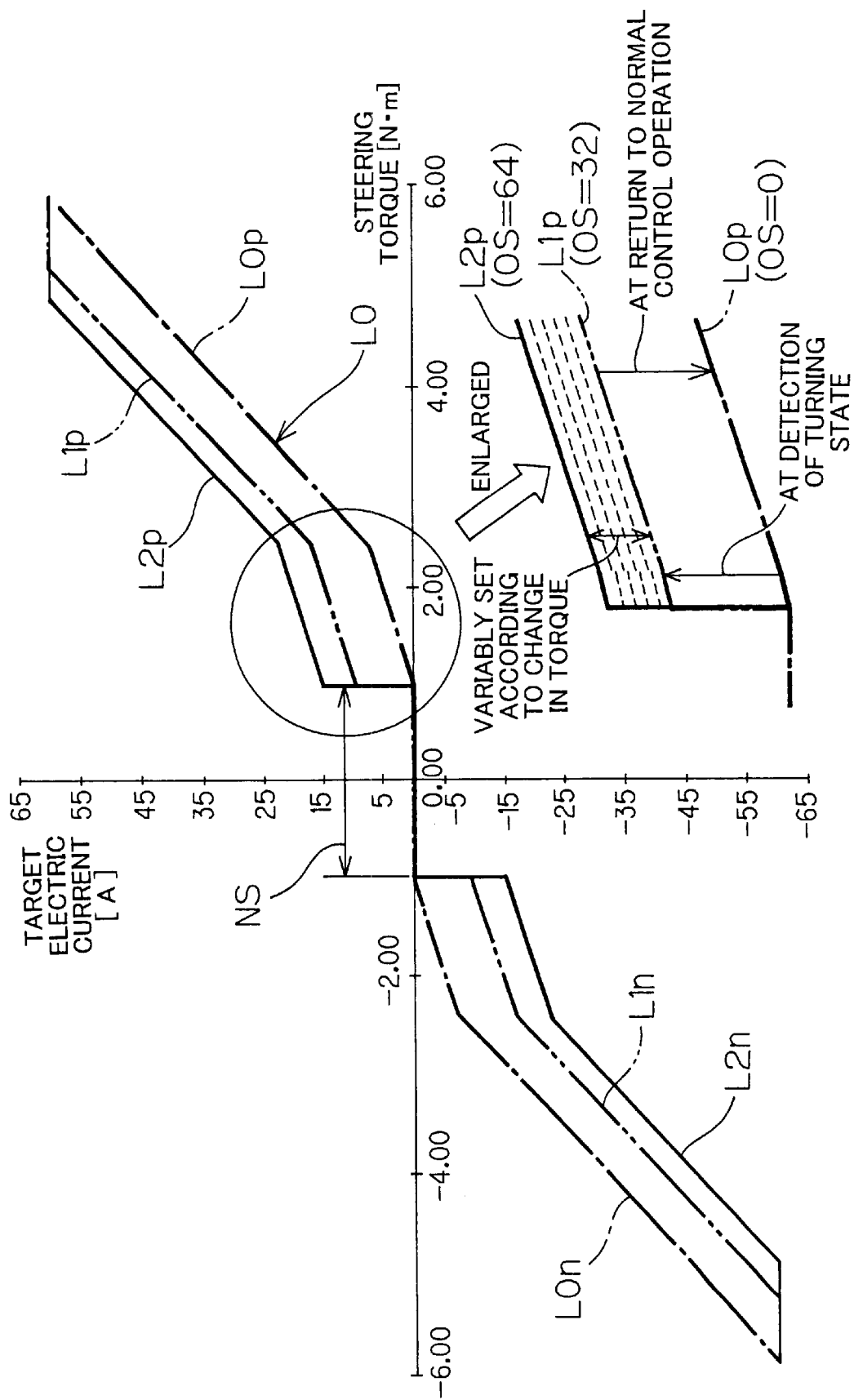
FIG. 2 is a diagram showing an exemplary assist characteristic.

FIG. 2 is a diagram showing an example of the assist characteristic on the basis of which the target electric current determining section 11 determines the target electric current. An initial characteristic is indicated by a curve L0 and, when the motor vehicle is in a traveling state other than the predetermined turning state, the target electric current determining section 11 determines the target electric current for the steering torque T on the basis of the curve L0. The steering torque T detected by the torque sensor 5 has a plus sign if it is directed to cause the steering wheel 1 to turn right (hereinafter referred to as "right rotation torque") and has a minus sign if it is directed to cause the steering wheel 1 to turn left (hereinafter referred to as "left rotation torque"). The target electric current has a positive value when a torque is to be applied to the steering mechanism 3 for right turn thereof, and has a negative value when a torque is to be applied to the steering mechanism 3 for left turn thereof.

A predetermined range of the steering torque around zero is defined as a dead zone, and the target electric current is set at zero irrespective of the value of the steering torque T within the dead zone. For convenience of explanation, a positive portion of the curve L0 away from the dead zone NS is hereinafter referred to as a positive initial assist characteristic curve L0p, and a negative portion of the curve L0 away from the dead zone NS is hereinafter referred to as a negative initial assist characteristic curve L0n. Similarly, a positive portion of the assist characteristic curve away from the dead zone NS is referred to as a positive assist characteristic curve, and a negative portion of the assist characteristic curve away from the dead zone NS is referred to as a negative assist characteristic curve.

In this embodiment, when the predetermined turning state is detected, the positive assist characteristic curve or the negative assist characteristic curve is offset from the initial assist characteristic curve L0p or L0n by the operation of the assist characteristic modifying section 13. More specifically, when the predetermined turning state is detected with a right rotation torque being applied to the steering wheel 1, the positive assist characteristic curve is gradually shifted to an initial offset characteristic curve L1p which is offset from the positive initial assist characteristic curve L0p to increase the target electric current. Similarly, when the predetermined turning state is detected with the left rotation torque being applied to the steering wheel 1, the negative assist characteristic curve is gradually shifted to an initial offset characteristic curve L1n which is offset from the negative initial assist characteristic curve L0n to reduce the target electric current (or to increase the absolute value of the target electric current).

That is, when the motor vehicle is in the predetermined turning state, a steering assist force greater than that to be applied when the motor vehicle is in any other traveling state is applied to the steering mechanism 3 from the electric motor 20. Thus, the burden to a driver who holds on the steering wheel 1 is alleviated.

In this embodiment, after transition of the assist characteristic from the initial assist characteristic curve L0p, L0n to the initial offset characteristic curve L1p, L1n is completed in the turning state, the assist characteristic curve is further modified in accordance with a change in the steering torque. More specifically, the positive assist characteristic curve is modified between the initial offset characteristic curve L1p and a positive upper limit assist characteristic curve L2p so as to increase or reduce the target electric current. Similarly, the negative assist characteristic curve is further modified between the initial offset characteristic curve L1n and a negative lower limit assist characteristic curve L2n so as to increase or reduce the target electric current.

Even when the motor vehicle is in the turning state, the assist characteristic is modified in accordance with the change in the steering torque T applied to the steering wheel 1, so that the steering assist force is properly applied to the steering mechanism 3. Thus, a satisfactory steering feeling can be provided.

Figure 3:
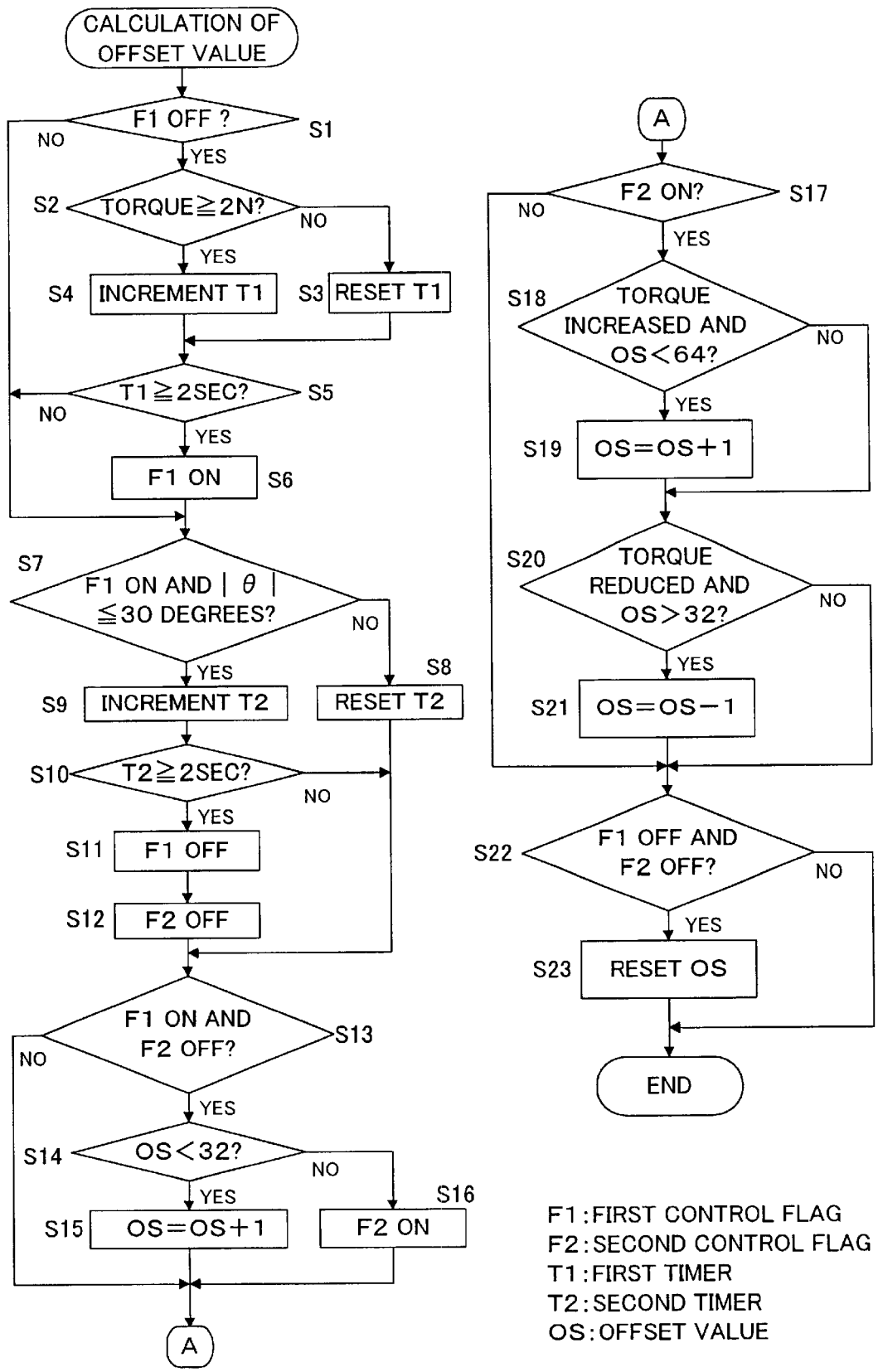
FIG. 3 is a flow chart for explaining a specific example of a process for modifying the assist characteristic.

FIG. 3 is a flow chart for explaining a specific example of a process to be performed by the traveling state judging section 14 and the assist characteristic modifying section 13. In this example, zones defined between the initial assist characteristic curve L0p and the positive upper limit assist characteristic curve L2p and between the initial assist characteristic curve L0n and the negative lower limit assist characteristic curve L2n are each divided into 64 levels, and an assist characteristic curve corresponding to one of these levels is selected on the basis of an offset value OS ($0 \leq OS \leq 64$). The initial assist characteristic curves L0p, L0n each correspond to an offset value of OS=0, while the positive upper limit assist characteristic curve L2p and the negative lower limit assist characteristic curve L2n each correspond to an offset value of OS=64.

More specifically, an offset target electric current is obtained by addition (where T>0) or subtraction (where T<0) of a value corresponding to the offset value OS to/from the target electric current (normal value) determined from the steering torque T in accordance with the initial assist characteristic curve L0p or L0n. As a result, a target electric current level according to the offset assist characteristic curve is determined.

The process shown in FIG. 3 is repeatedly performed in a predetermined control cycle during the operation of the electric power steering system (during which an ignition key switch is on).

More specifically, it is first judged whether a first control flag F1 is off to determine whether the motor see vehicle is in the turning state (Step S1). If the motor vehicle is not in the turning state, the first control flag F1 is off. In this case, it is judged whether the steering torque T (absolute value) is a predetermined value (2N in this embodiment) or greater (Step S2). If the steering torque is 2N or greater, a first timer T1 is incremented for measuring the duration of this state (Step S4), and then it is judged whether the duration measured by the first timer T1 reaches a predetermined period of time (two seconds in this embodiment) (Step S5). If the duration measured by the first timer T1 has reached two seconds, the first control flag F1 is set on (Step S6) to indicate that the motor vehicle has come into the turning state.

If the steering torque T is smaller than 2N when the first control flag F1 is off (NO in Step S2), the first timer T1 is reset (Step S3). Therefore, the first control flag F1 is set on to indicate that the motor vehicle has come into the turning state when the steering torque T is kept at 2N or greater for two seconds or more.

If it is judged in Step S1 that the first control flag F1 is on, if it is judged in Step S5 that the duration measured by the first timer T1 has not reached two seconds, or if the first control flag F1 is set on in Step S6, the process goes to Step S7.

In Step S7, it is judged whether the first control flag F1 is on and the absolute value of the steering angle θ (the rotation angle of the steering wheel 1) detected by the steering angle sensor 6 is 30 degrees or smaller. That is, it is judged whether the steering angle θ has a small value around a steering midpoint. A great steering assist force is not necessary when the steering angle is around the steering midpoint. Therefore, when a second timer T2 detects a predetermined time duration (two-second duration in this embodiment) of a state where the condition of Step S7 is satisfied even with the first control flag F1 being on (Steps S9 and S10), the first control flag F1 is set off (Step S11), and then a second control flag F2 is set off (Step S12). The second control flag F2 is set on upon completion of the transition of the assist characteristic from the initial assist characteristic L0p, L0n to the initial offset characteristic L1p, L1n.

If it is judged in Step S7 that the first control flag F1 is off or the absolute value of the steering angle θ is greater than 30 degrees, the second timer T2 is reset (Step S8), and the process goes to Step S13. Similarly, if the duration of the state where the condition of Step S7 is satisfied is less than two seconds as measured by the second timer T2 (NO in Step S10), the process goes to Step S13.

In Step S13, it is judged whether the first control flag F1 is on and the second control flag F2 is off. That is, it is judged whether the transition of the assist characteristic to the initial offset characteristic L1p, L1n is uncompleted though the motor vehicle has come into the turning state. If the condition of Step S13 is satisfied, it is judged whether the offset value OS is smaller than 32 (Step S14). Since the offset value OS is smaller than 32 during the transition of the assist characteristic from the initial assist characteristic L0p, L0n to the initial offset characteristic L1p, L1n, the judgment in Step S14 is positive thereby to increment the offset value OS by one (Step S15). The offset value OS is incremented on every control cycle until the first control flag F1 is set off after the steering angle θ is kept smaller for two seconds or more. Thus, the assist characteristic is gradually changed from the initial assist characteristic curve L0p, L0n to the initial offset characteristic curve L1p, L1n.

When the offset value OS reaches 32, the judgment in Step S14 is negative, and the second control flag F2 is set on (Step S16) to indicate the completion of the transition of the assist characteristic to the initial offset characteristic curve L1p, L1n.

In Step S17, it is judged whether the second control flag F2 is on. If the second control flag F2 is on, it is further judged whether the steering torque T (absolute value) is increased and the offset value OS is smaller than 64 which is the upper limit value (Step S18). The increase in the steering torque T is judged, for example, by determining whether a steering torque T detected on the current control cycle is greater than a steering torque T detected a predetermined period (e.g., 250 m sec) before.

If the steering torque T is increased and the offset value OS is smaller than 64 (the upper limit value) (YES in Step S18), the offset value OS is incremented by one (Step S19) and, if not (NO in Step S18), the offset value OS is kept at the same value.

Then, it is judged whether the steering torque T is reduced and the offset value OS is greater than 32 which corresponds to the initial offset characteristic curve L1p, L1n (Step S20). The reduction in the steering torque T is judged, for example, by determining whether a steering torque T detected on the current control cycle is smaller than a steering torque T detected a predetermined period (e.g., 250 m sec) before.

If the steering torque T is reduced and the offset value OS is greater than 32 (YES in Step S20), the offset value OS is decremented by one (Step S21) and, if not (NO in Step S20), the offset value OS is kept at the same value.

Thus, the assist characteristic is optimized between the initial offset characteristic L1p and the positive upper limit offset characteristic L2p or between the initial offset characteristic L1n and the negative lower limit offset characteristic L2n by incrementing or decrementing the offset value OS between 32 and 64 in accordance with the change in the steering torque T when the motor vehicle is in the turning state.

More specifically, the positive assist characteristic is modified so as to increase the target electric current in accordance with the increase in the offset value OS and reduce the target electric current in accordance with the decrease in the offset value OS. Similarly, the negative assist characteristic is modified so as to reduce the target electric current (increase the absolute value thereof) in accordance with the increase in the offset value OS and increase the target electric current (reduce the absolute value thereof) in accordance with the decrease in the offset value OS.

If the second control flag F2 is off (NO in Step S17), the assist characteristic does not reach the initial offset characteristic curve L1p, L1n and, therefore, a process sequence from Steps S18 to S21 is skipped.

In Step S22, it is judged whether both of the first and second control flags F1, F2 are off. If the judgment in Step S22 is positive, the offset value OS is reset to zero (Step S23), so that the assist characteristic is reset as corresponding to the initial assist characteristic curve L0p, L0n. If at least one of the first and second control flags F1, F2 is on (NO in Step S22), the offset value OS is not reset.

In accordance with this embodiment, when the motor vehicle comes into the turning state, the assist characteristic is thus gradually changed from the initial assist characteristic L0p, L0n to the initial offset characteristic L1p, L1n. Subsequently, the offset of the assist characteristic is changed between the initial offset characteristic L1p and the positive upper limit offset characteristic L2p or between the initial offset characteristic L1n and the negative lower limit offset characteristic L2n in accordance with the change in the steering torque T. Thus, the steering hold-on operation is properly assisted in the turning state to provide a satisfactory steering feeling.

Figure 4:
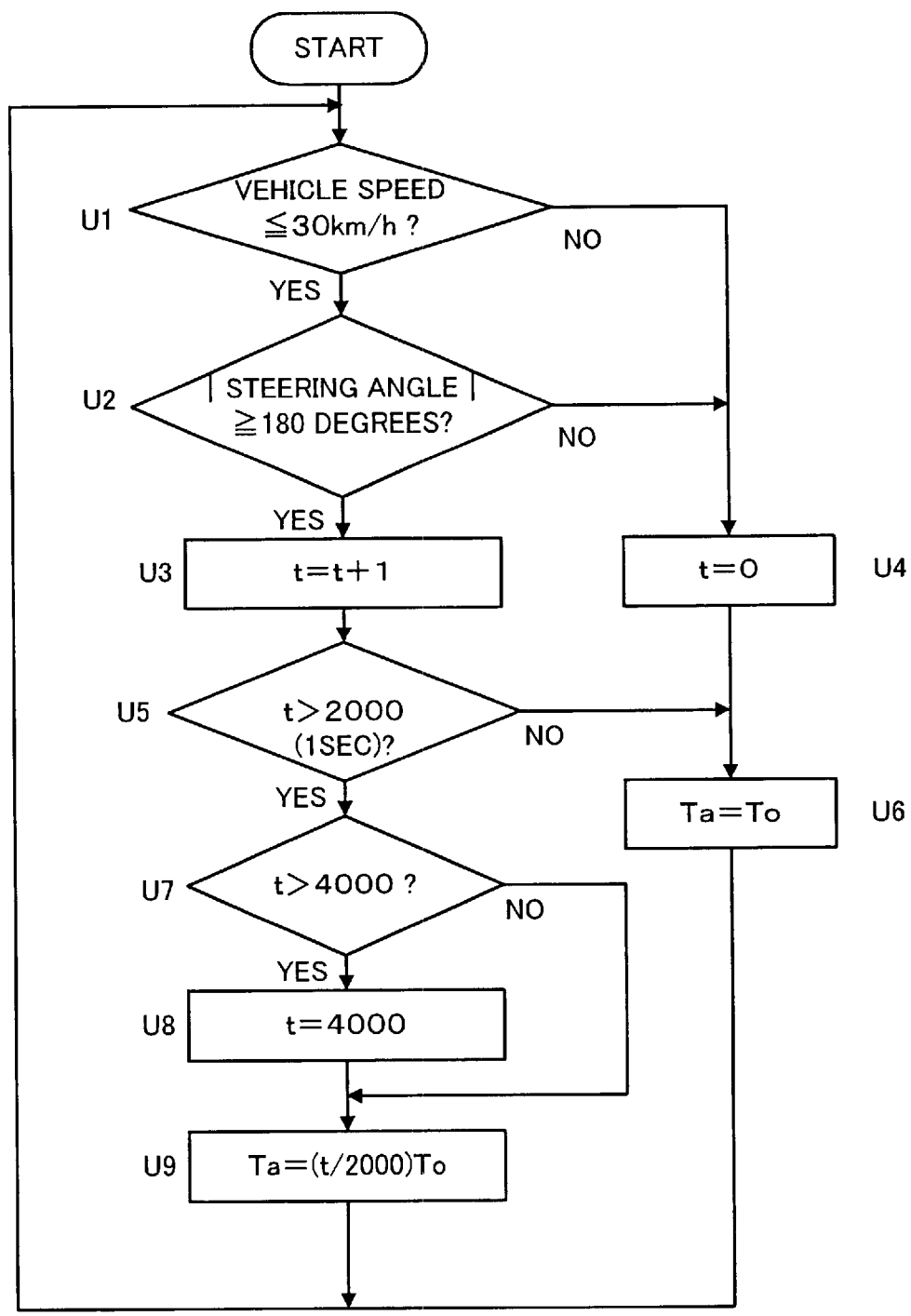
FIG. 4 is a flow chart for explaining the operation of an electric power steering system according to a second embodiment of the present invention.

FIG. 4 is a flow chart for explaining the operation of an electric power steering system according to a second embodiment of the present invention. For explanation of this embodiment, a reference is made again to FIGS. 1 and 2, and overlapped description will be minimized.

This embodiment aims at alleviation of the burden to a driver in the steering hold-on operation when the motor vehicle is in a turn-around steering state which is one of the typical turning states. In this embodiment, the motor vehicle is considered to be in the turn-around steering state if the steering angle θ (absolute value) is kept at 180 degrees or greater for not less than a predetermined period (e.g., two seconds) in low-speed traveling (at 30 km/h or lower), and the steering assist force is increased in such turn-around steering state.

More specifically, the controller 10 (see FIG. 1) judges whether the vehicle speed V detected by the vehicle speed sensor 7 is 30 km/h or lower (Step U1). If the vehicle speed is 30 km/h or lower, it is judged whether the absolute value of the steering angle θ (the rotation angle of the steering wheel 1) detected by the steering angle sensor 6 is 180 degrees or greater (Step U2). If the judgment in Step U2 is positive, a count value t is incremented by one (Step U3). The count value t corresponds to the duration of a state where the vehicle speed V is 30 km/h or lower and the steering angle θ is 180 degrees or greater. In this embodiment, t=2000 is equivalent to one second. If it is judged in Step U1 that the vehicle speed V is higher than 30 km/h or if it is judged in Step U2 that the steering angle θ is smaller than 180 degrees, the count value t is reset to zero (Step U4), and the target electric current value Ta is set at a normal value To which corresponds to the initial assist characteristic L0 shown in FIG. 2 (Step U6). The normal value To is determined in accordance with the steering torque T on the basis of the initial assist characteristic curve L0 shown in FIG. 2.

After the count value t is incremented in Step U3, it is judged whether the count value t exceeds 2000 which indicates a lapse of one second (Step U5). If the count value t has not exceeded 2000, the process goes to Step U6 to set the target electric current value Ta at the normal value To. That is, a normal steering assist force is applied to the steering mechanism 3.

If the count value t exceeds 2000 (YES in Step U5), it is further judged whether the count value t exceeds 4000 (Step U7). While the judgment in Step U7 is negative, the process skips Step U8, and the target electric current value Ta is determined from the following equation in Step U9.

$$Ta = (t/2000)To \quad (1)$$

More specifically, the target electric current value Ta is gradually changed from the normal value To to have an increased absolute value, as the count value t indicative of the duration of the turning state is increased. Therefore, the steering assist force to be applied to the steering mechanism 3 is gradually increased.

If the judgment in Step U7 is positive, the count value t is fixed at 4000 (Step U8), and a state of Ta=2To is maintained (Step U9). That is, at a time point when the target electric current Ta reaches a level twice as high as the normal value To, the increase in the absolute value thereof is stopped.

If the vehicle speed V thereafter exceeds 30 km/h (NO in Step U1) or if the absolute value of the steering angle θ thereafter becomes smaller than 180 degrees (NO in Step U2), the count value t is reset to zero (Step U4), and the target electric current value Ta is reset to the normal value To (Step U6).

In this embodiment, the turning state with the turn-around steering operation is detected (Steps U1 to U5), and a steering assist force greater than a normal steering assist force is generated in the turn-around steering operation (Steps U7 to U9). Thus, the driver need not apply a greater torque to the steering wheel 1 for the steering hold-on operation, so that the steering feeling is improved.

Figure 5:
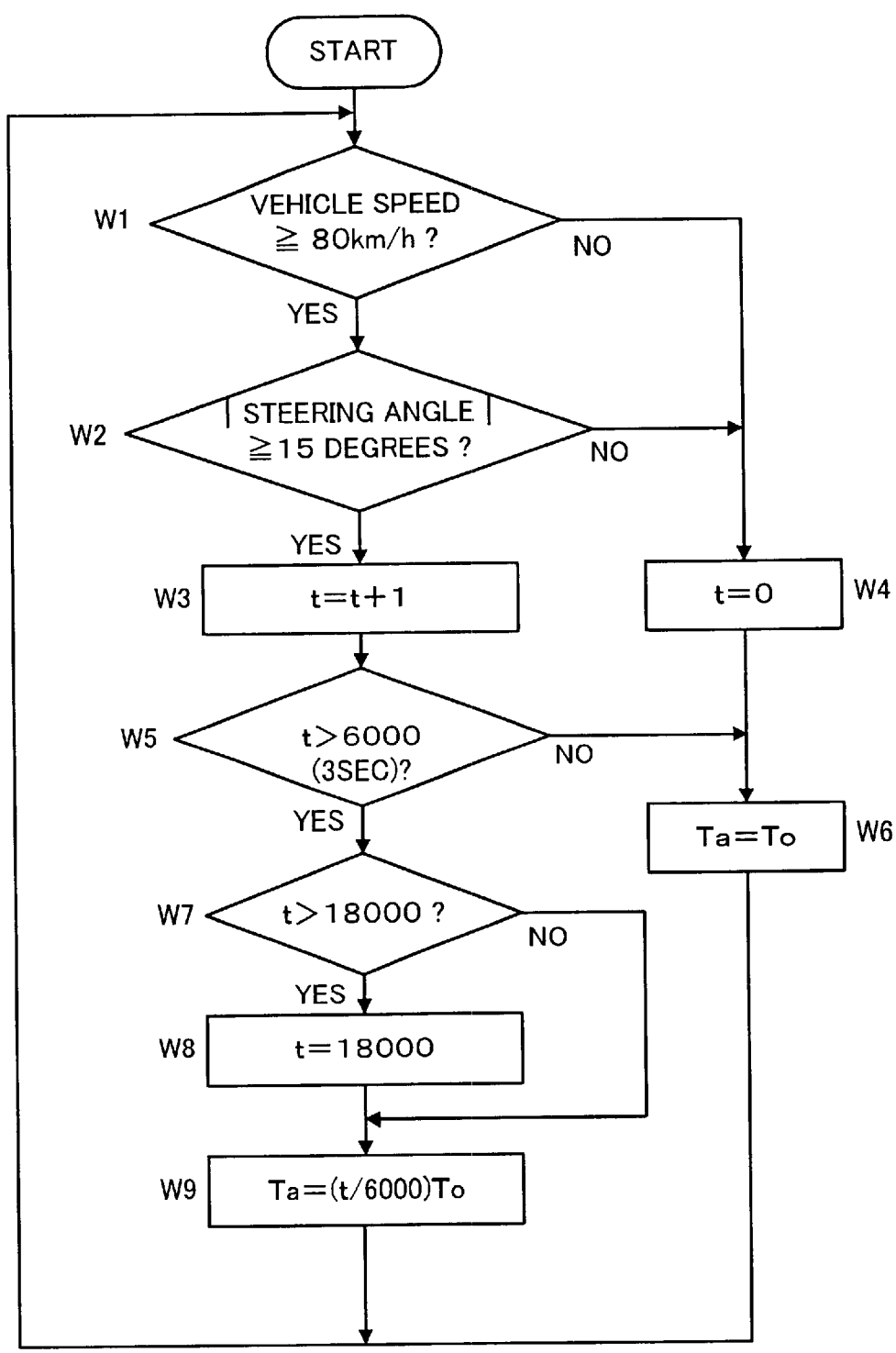
FIG. 5 is a flow chart for explaining the operation of an electric power steering system according to a third embodiment of the present invention.

FIG. 5 is a flow chart for explaining the operation of an electric power steering system according to a third embodiment of the present invention. For explanation of this embodiment, a reference is made again to FIGS. 1 and 2, and overlapped description will be minimized.

This embodiment aims at alleviation of the burden to a driver in the steering hold-on operation when the motor vehicle assumes the turning state to travel a long and gently curved road, for example, on a highway. In this embodiment, the motor vehicle is considered to assume the turning state to travel a long and gently curved road if the steering angle θ (absolute value) is kept at 15 degrees or greater for not less than a predetermined period (e.g., three seconds) in high-speed traveling (at 80 km/h or higher), and the steering assist force is increased in such turning state.

More specifically, the controller 10 (see FIG. 1) judges whether the vehicle speed V detected by the vehicle speed sensor 7 is 80 km/h or higher (Step W1). If the vehicle speed is 80 km/h or higher, it is judged whether the absolute value of the steering angle θ (the rotation angle of the steering wheel 1) detected by the steering angle sensor 6 is 15 degrees or greater (Step W2). If the judgment in Step W2 is positive, a count value t is incremented by one (Step W3). The count value t corresponds to the duration of a state where the vehicle speed V is 80 km/h or higher and the steering angle θ is 15 degrees or greater. In this embodiment, t=2000 is equivalent to one second. If it is judged in Step W1 that the vehicle speed V is lower than 80 km/h or if it is judged in Step W2 that the steering angle θ is smaller than 15 degrees, the count value t is reset to zero (Step W4), and the target electric current value Ta is set at the normal value To which corresponds to the initial assist characteristic L0 shown in FIG. 2 (Step W6). The normal value To is determined in accordance with the steering torque T on the basis of the initial assist characteristic curve L0 shown in FIG. 2.

After the count value t is incremented in Step W3, it is judged whether the count value t exceeds 6000 which indicates a lapse of three seconds (Step W5). If the count value t does not exceed 6000, the process goes to Step W6 to set the target electric current value Ta at the normal value To. That is, a normal steering assist force is applied to the steering mechanism 3.

If the count value t exceeds 6000 (YES in Step W5), it is further judged whether the count value t exceeds 18000 (Step W7). While the judgment in Step W7 is negative, the process skips Step W8, and the target electric current value Ta is determined from the following equation in Step W9.

$$Ta = (t/6000)To \quad (2)$$

More specifically, the target electric current value Ta is gradually changed from the normal value To to have an increased absolute value, as the count value t indicative of the duration of the turning state is increased. Therefore, the steering assist force to be applied to the steering mechanism 3 is gradually increased. However, the rate of the increase in the steering assist force is lower than in the second embodiment.

If the judgment in Step W7 is positive, the count value t is fixed at 18000 (Step W8), and a state of Ta=3To is maintained (Step W9). That is, at a time point when the target electric current Ta reaches a level three times as high as the normal value To, the increase in the absolute value thereof is stopped.

If the vehicle speed V thereafter becomes lower than 80 km/h (NO in Step W1) or if the absolute value of the steering angle θ there after becomes smaller than 15 degrees (NO in Step W2), the count value t is reset to zero (Step W4), and the target electric current value Ta is reset to the normal value To (Step W6).

In this embodiment, the turning state in which the motor vehicle travels the long and gently curved road is detected (Steps W1 to W5), and a steering assist force greater than a normal steering assist force is generated in the turning state (Steps W7 to W9). Thus, the driver need not apply a greater torque to the steering wheel 1 for a long time for the steering hold-on operation, so that the steering feeling is improved.

While the three embodiments of the present invention have thus been described, the invention may be embodied in any other ways. Although the assist characteristic is first changed from the initial characteristic to the initial offset characteristic and further modified in accordance with the change in the steering torque in the first embodiment, this process may be omitted. In the second and third embodiments, on the contrary, the modification of the assist characteristic in accordance with the change in the steering torque is not carried out. However, the assist characteristic employed when the count value t reaches the upper limit (which is 4000 in the second embodiment and 18000 in the third embodiment) may be regarded as the initial offset characteristic, and further modified in accordance with the change in the steering torque. Where such a control operation is performed, the upper limit of the count value t may be set lower than the values employed in the aforesaid embodiments.

Although the assist characteristic corresponding to an offset value of OS=32 is fixedly set as the initial offset characteristic in the first embodiment, the initial offset characteristic may variably be set in accordance with the magnitude of the steering torque. More specifically, the initial offset characteristic may be determined on the basis of an average of a predetermined number of values of the steering torque T sampled before the first control flag F1 is set on (Step S6). Alternatively, values of the steering torque T sampled in the control cycle during the gradual increase in the offset value OS (Steps S13 to S16) may also be taken into consideration, and the initial offset characteristic may be determined on the basis of an average of a predetermined number of values of the steering torque T sampled immediately before it is determined that the initial offset characteristic is reached (Step S14).

Similarly, the initial offset characteristic may variably be set in accordance with previous values of the target electric current. More specifically, the offset characteristic may be determined, for example, in accordance with an average of a predetermined number of values of the target electric current sampled in control cycles before the first control flag F1 is set on.

In any case, the initial offset characteristic is determined in accordance with the magnitude of the steering assist force applied before the assist characteristic is changed to the initial offset characteristic (initial offset determining circuit).

In the first embodiment, the assist characteristic is reset to the initial characteristic on condition that the absolute value of the steering angle θ is kept at 30 degrees or smaller for two seconds or more (Steps S7 to S12, S22 and S23). However, the reset of the assist characteristic to the initial characteristic may be effected by resetting the offset value OS when the rate of the decrease in the steering torque T is not lower than a predetermined level (e.g., about 5 N/sec). This process may also be employed in the second and third embodiments.

The second and third embodiments may be employed in combination. More specifically, the rate of the change in the assist characteristic is changed in accordance with the vehicle speed, so that the assist characteristic is gradually offset in a manner suitable for the turn-around steering operation or for the gentle curve traveling. Further, the first, second and third embodiments may be employed in combination. More specifically, the control operation of the second embodiment is employed when the vehicle speed is 30 km/h or lower during the low speed traveling, and the control operation of the third embodiment is employed when the vehicle speed is 80 km/h or higher during the high speed traveling. The control operation of the first embodiment is employed under any other conditions.

While the present invention has been described in detail by way of the embodiments thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 11-286930 filed to the Japanese Patent Office on Oct. 7, 1999, the disclosure thereof being incorporated herein by reference.

What is claimed is:

1. An electric power steering system which assists a steering operation by controlling an electric motor on the basis of a target electric current determined in accordance with a steering torque applied to an operation member and applying a driving force to a steering mechanism from the electric motor, the electric power steering system comprising:

steering torque detecting section for detecting a steering torque;

target electric current determining circuit for determining a target electric current in accordance with the steering torque detected by the steering torque detecting section on the basis of an assist characteristic indicative of a relationship between the steering torque and the target electric current;

motor controlling circuit for controlling the electric motor on the basis of the target electric current determined by the target electric current determining circuit for driving the electric motor; and assist characteristic modifying circuit for modifying the assist characteristic by offsetting the assist characteristic from an initial characteristic when a motor vehicle incorporating the electric power steering system is in a predetermined turning state.

2. An electric power steering system as set forth in claim 1, wherein the assist characteristic modifying circuit modifies the assist characteristic so that the electric motor generates a greater driving force when the motor vehicle is in the predetermined turning state than when the initial characteristic is employed as the assist characteristic.

3. An electric power steering system as set forth in claim 1, wherein the assist characteristic modifying circuit comprises a circuit for determining that the motor vehicle is in the predetermined turning state on condition that the steering torque detecting section keeps detecting a torque not smaller than a predetermined level for not less than a predetermined period.

4. An electric power steering system as set forth in claim 1, further comprising steering angle detecting circuit for detecting a steering angle of the operation member, wherein the assist characteristic modifying circuit comprises a circuit for determining that the motor vehicle is in the predetermined turning state on condition that the steering angle detecting circuit keeps detecting a steering angle not smaller than a predetermined level for not less than a predetermined period.

5. An electric power steering system as set forth in claim 1, further comprising vehicle speed detecting section for detecting a speed of the motor vehicle, wherein the assist characteristic modifying circuit offsets the assist characteristic from the initial characteristic on condition that the vehicle speed detected by the vehicle speed detecting section is not higher than a first vehicle speed.

6. An electric power steering system as set forth in claim 1, further comprising vehicle speed detecting section for detecting a speed of the motor vehicle, wherein the assist characteristic modifying circuit offsets the assist characteristic from the initial characteristic on condition that the vehicle speed detected by the vehicle speed detecting section is not lower than a second vehicle speed.

7. An electric power steering system as set forth in claim 6, wherein the second vehicle speed is higher than the first vehicle speed.

8. An electric power steering system as set forth in claim 1, further comprising vehicle speed detecting section for detecting a speed of the motor vehicle, wherein the assist characteristic modifying circuit comprises:

a circuit for offsetting the assist characteristic from the initial characteristic on condition that the vehicle speed detected by the vehicle speed detecting section is not higher than a first vehicle speed; and a circuit for offsetting the assist characteristic from the initial characteristic on condition that the vehicle speed detected by the vehicle speed detecting section is not lower than a second vehicle speed which is higher than the first vehicle speed, wherein the assist characteristic is gradually changed from the initial characteristic to the offset characteristic so that the rate of a change in the assist characteristic is lower when the vehicle speed is not lower than the second vehicle speed than when the vehicle speed is not higher than the first vehicle speed.

9. An electric power steering system as set forth in claim 5, wherein the assist characteristic modifying circuit offsets the assist characteristic from the initial characteristic on condition that the motor vehicle is in a turning state with a steering angle not smaller than a first steering angle when the vehicle speed detected by the vehicle speed detecting section is not higher than the first vehicle speed.

10. An electric power steering system as set forth in claim 5, wherein the assist characteristic modifying circuit offsets the assist characteristic from the initial characteristic on condition that the motor vehicle is in a turning state with a steering angle not smaller than a second steering angle when the vehicle speed detected by the vehicle speed detecting section is not lower than the second vehicle speed.

11. An electric power steering system as set forth in claim 10, wherein the second steering angle is smaller than the first steering angle.

12. An electric power steering system as set forth in claim 1, wherein the assist characteristic modifying circuit comprises assist characteristic transition circuit for gradually effecting transition of the assist characteristic to an initial offset characteristic which is offset by a predetermined value from the initial characteristic when the motor vehicle comes into the predetermined turning state.

13. An electric power steering system as set forth in claim 12, wherein the assist characteristic modifying circuit further comprises torque adapting circuit for further modifying the assist characteristic in accordance with the change in the steering torque detected by the steering torque detecting circuit after the transition of the assist characteristic to the initial offset characteristic.

14. An electric power steering system as set forth in claim 12, wherein the assist characteristic modifying circuit further comprises initial offset determining circuit for determining the initial offset characteristic in accordance with a magnitude of a steering assist force applied during a predetermined period before the assist characteristic is changed to the initial offset characteristic.

* * * * *